Sept. 19, 1967 W. A. BRIDGE ETAL 3,341,888
AUTOMATIC CONTROL SYSTEM AND METHOD
Filed April 18, 1963 3 Sheets-Sheet 2
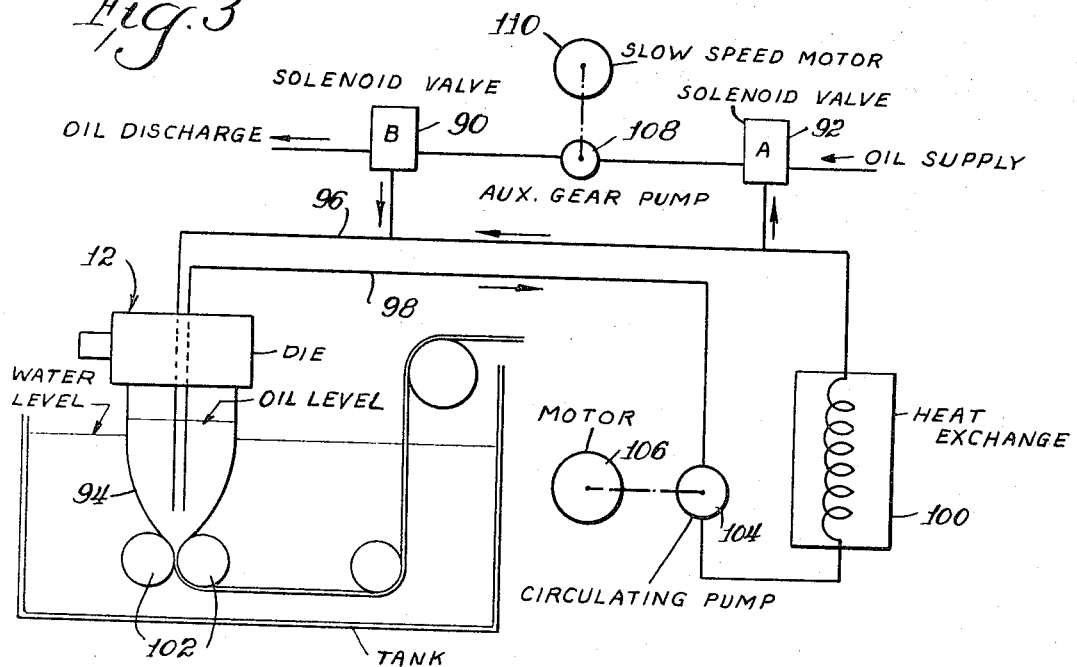
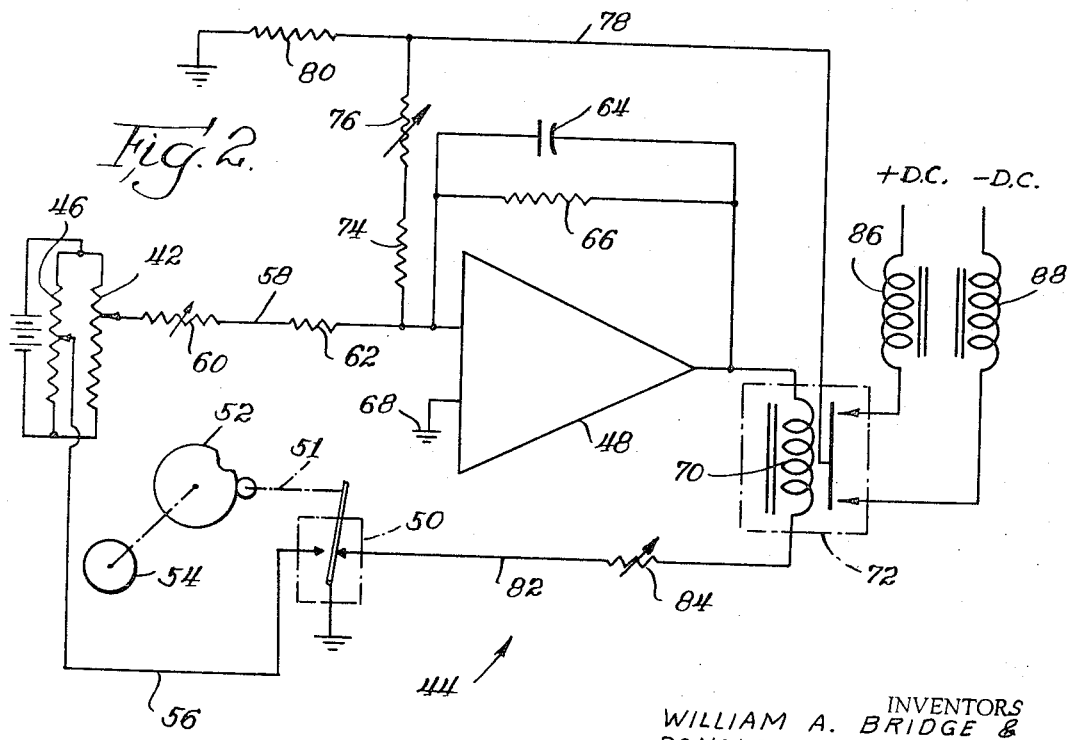
INVENTORS
WILLIAM A. BRIDGE &
DONALD J. CRAWFORD
BY
Stephen J. Rudey
Jerome Rudy
ATT'YS

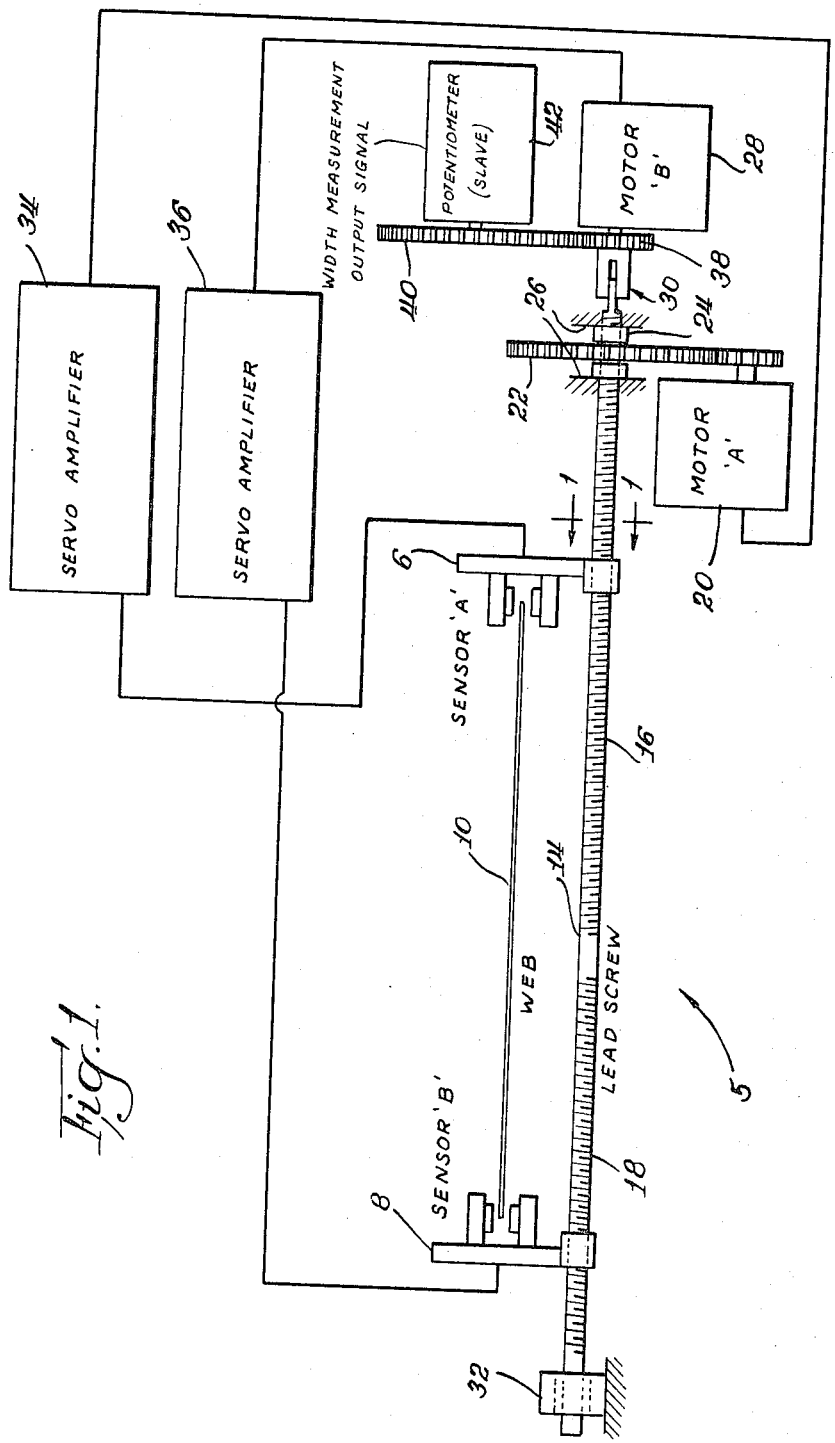

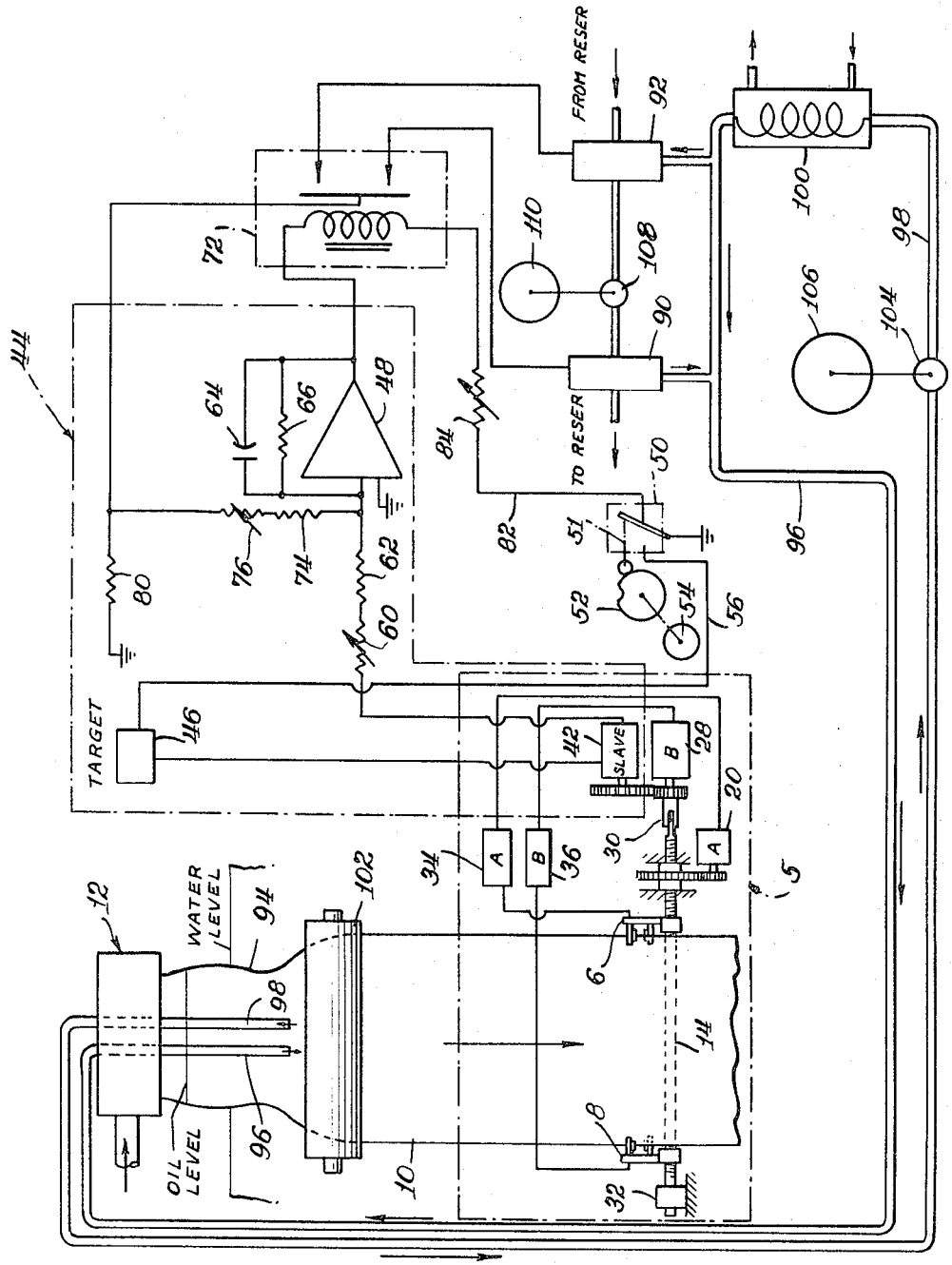

3,341,888
AUTOMATIC CONTROL SYSTEM AND METHOD
William A. Bridge, Midland, and Donald J. Crawford, Sanford, Mich., assignors to The Dow Chemical Company, Midland, Mich., a corporation of Delaware
Filed Apr. 18, 1963, Ser. No. 274,009
11 Claims. (Cl. 18—2)

This invention relates to an automatic control system and method and more particularly to an arrangement for automatically sensing and measuring a change in value from a predetermined set point in a continuous process and a control arrangement for automatically regulating the process so that the predetermined set point value will be maintained.

While the system of the invention has been disclosed as applied to a continuous process for the formation of plastic tubing, wherein the width of the tubing is to be maintained at a predetermined value, it will be readily apparent that the inventive principles involved may be effectively utilized in any one of a great many continuous processes wherein automatic control of a given parameter is desired.

Briefly, the sensing means of the invention comprises a pair of ultrasonic transducers mounted upon a lead screw in a manner as to allow relative movement between the transducers, said transducers being positioned one at each edge of a web of flattened plastic tubing coming from an extruder. The lead screw is arranged for rotary as well as axial movement by independently operated motor means. It will be seen that the transducer and lead screw arrangement will provide accurate measurement of web width even though lateral web shift may occur. Change in web width dimension from a predetermined set point results in generation of a signal by one or both of the transducers, which signal is transmitted to servo-amplifier means. The latter causes operation of the motor means associated with the lead screw whereby one or more of the transducers is repositioned. Such transducer repositioning results in generation of an error signal which is transmitted to a control arrangement including an operational amplifier in an electrical circuit which is adapted to cause linear discharge of an integrating capacitor. The control arrangement is adapted to initiate corrective action, in accordance with the error signal, whereby the process will be influenced so that web width will be returned to predetermined set point dimension.

It has always been a problem in web control apparatus to easily and accurately measure variable distance between the web edge sensor heads. In the device of the present invention, such measurement is effected in a simple and exact manner, in view of the fact that the sensor heads are both drivingly mounted upon the same lead screw. Accordingly, the distance between the sensor heads is related to the number of screw threads therebetween, hence, bears a direct ratio to the number of revolutions of the lead screw between balance and zero position of the sensor heads.

The electrical circuitry of the invention provides a true linear integration of the input, or error signal, to thus produce a control on-time which is linearly proportioned to the integrated value of the input signal. In such manner, an effective and reliable control of process variable is achieved.

It is a primary object of this invention to provide an improvement in an automatic control system and method for automatically sensing and measuring a change in value from a predetermined set point in a continuous process for automatically regulating the process so that the predetermined set point value will be maintained.

A more specific object is to provide a web width measuring means wherein lateral distance between web edge sensor heads is continuously measured in a simple and exact manner.

A further object is to provide a web width measuring means which will accurately measure change in web width even though the center and/or the edges of the web should wander from predetermined set points.

Another object is to provide a web width measuring means which will develop an error signal indicative of variation of web width from a predetermined set point.

A further object is to provide an automatic control arrangement which will operate to control a process variable in accordance with an input error signal.

Still another object is to provide an automatic control arrangement including electrical circuitry adapted to produce a control on-time which is linearly proportional to the integrated value of an input signal.

These and further objects and features of the invention will become more apparent from the following description and accompanying drawings wherein:

FIG. 1 is a schematic illustration of a web width monitoring and measuring arrangement embodying the principles of the invention;

FIG. 2 is a schematic illustration of an electrical circuit used in the control system of the invention;

FIG. 3 is a schematic illustration of an oil flow arrangement used in the process being controlled by the system of the invention; and FIG. 4 is a schematic illustration of the complete automatic control system of the invention.

Referring now to the drawings and more particularly to FIG. 1, a web width monitoring measuring means 5 is shown which includes a pair of web edge sensor means, or heads, 6 and 8 shown as positioned adjacent the right and left edges respectively of a sheet or web 10. The web in this instance is a flattened tube of clear plastic material which is being moved upon rollers from an extruder 12 (FIG. 4) after having passed through a liquid bath, as is usual practice for tube setting in plastic film extrusion technique. In web edge control apparatus, the edge sensor means may be any one of several basic types of tranducers, i.e., photo-electric, responsive to radiant energy, air, vacuum, etc. However, in this case, primarily because of the transparency of the web 10, the sensor means 6 and 8 utilize ultrasonic energy for development of a web edge position signal, and may be of the type known as "Massa TR–7 Ultrasonic Transducers," which are available on the market as a standard item of commerce.

The edge sensor means 6 and 8 are operatively mounted for relative lateral movement upon a lead screw 14 having right hand threads 16 on the right half of the screw and left hand threads 18 on the left half of the screw. Rotation of the lead screw 14 in a clockwise direction—as seen from line 1—1 in FIG. 1—will result in simultaneous movement of the sensor heads away from each other, while rotation of the lead screw in a counterclockwise direction will result in simultaneous movement of the sensor heads toward each other. Means (not shown) are provided to maintain the sensor heads in the same vertical plane, which is maintained in all positions of repose and movement of the sensor heads. The web 10, being under tension as it is moved by flight directing rollers, is positioned so that the edges are maintained vertically midway between the jaws of the sensor heads.

The lead screw is arranged for both axial movement and rotary movement. Toward this end a motor A, identified by numeral 20, is arranged to rotatably drive a gear 22 which is affixed to a threaded sleeve 24 mounted on the lead screw 14 at the right end thereof. The sleeve 24 is restrained against lateral movement by thrust bearing surfaces 26. It will be seen that clockwise rotation of motor 20, as viewed from the right end of FIG. 1, will cause axial movement of the lead screw toward the left, while counter-clockwise rotation of motor 20 will cause axial movement of the lead screw toward the right. A motor B, identified by numeral 28, is arranged at the right end of the lead screw and is connected thereto by means of a slip coupling 30 which allows axial movement in either direction of the lead screw relative to the motor 28. Rotation of the motor 28 in a clockwise direction will turn the lead screw so that the sensor head 8 will be moved away from sensor 6, while rotation of the motor 28 in a counter-clockwise direction will turn the lead screw so that the sensor head 8 will be moved toward sensor head 6. The sensor 6 will cause motor 20 to drive to balance, while sensor 8 will cause motor 28 to drive to balance. The left end of the lead screw 14 is free of threads and is slidably supported in a bearing, or journal, 32. While both motors are of the same speed, motor A is coupled to the screw in the ratio of 6:7, while B is coupled to the screw in the ratio of 5:6. Slightly different speed ratios are desired to minimize hunting.

Operation of motor A, in either direction of rotation, is controlled by a servo-amplifier 34 which is arranged to receive an electrical input signal from the right sensor head 6, while operation of motor B in either direction of rotation is controlled by a servo-amplifier 36 which is arranged to receive an electrical input signal from the left sensor head 8. The amplitude of the output signal from each sensor head 6 and 8 is inversely dependent upon the amount of ultrasonic energy blocked by the edge of the web. An appropriate bucking voltage in the servo-circuit causes the sensor head, being driven by its balancing motor, to follow the related web edge. A gear 38, mounted on the shaft of motor B, meshes with a gear 40 mounted on the shaft of a slave potentiometer 42. It will be seen that rotary movement of the motor B in either direction will result in a change in setting of the potentiometer 42. Hence, the operational setting of the potentiometer will bear a direct relationship to the distance between the sensor heads 6 and 8. In such manner, the control effect of the potentiometer will be a function of web width, and will be utilized in the control of web width, as will be set forth in greater detail hereinafter.

In setting the web width measurement means 5, two basic adjustments are required. First, the servo-amplifiers 34 and 36 must be set so that a balance point is realized between each web edge and the respective sensor head. In other words, the servo-amplifier for a given sensor head must initiate appropriate motor operation when the edge of the web moves out of set position with respect to the jaws of the respective sensor head. For most purposes, such set position will be at a point wherein the web edge blocks out one-half the sensing area of the given sensor head, as illustrated in FIG. 1. Hence, when the ultrasonic energy directed from an emitter jaw of a sensor head toward the receiver jaw of said sensor head is increased or decreased by shift of web edge from set position, the servo-amplifier associated with said sensor head will cause operation of the motor controlled thereby for movement of the sensor head back to set or balance position. Second, the potentiometer 42 must be set by engaging the gearing associated therewith at an appropriate point. For example, assume that a ten turn potentiometer 42 is being used, which is geared to the lead screw 14 in a 40:1 reduction; i.e., forty revolutions of the lead screw will cause one revolution of the potentiometer. If the lead screw threads 16 and 18 are spaced at eight threads per inch, then forty revolutions of the lead screw 14 will cause one revolution of the potentiometer 42, and a relative movement of 10.0 inches between the sensor heads 6 and 8. By spacing the sensor balance points to a convenient distance of 40.0 inches and turning the slave potentiometer exactly four full turns from the "zero" end, the output of the potentiometer will be exactly proportional to the physical distance between sensor balance points anywhere on the lead screw. No other adjustment of the slave potentiometer 42 is necessary regardless of whether a web width of 15 inches or 40 inches is being controlled.

The potentiometer 42 is incorporated in an electrical circuit 44 which is adapted to regulate control of web width. As best seen in FIG. 2, the electrical circuit 44 includes a target potentiometer 46 which forms a bridge circuit with the slave potentiometer 42. The target potentiometer 46, which is identical with the slave potentiometer 42, is adjusted to obtain the desired web width; voltage difference between the slave and target potentiometer outputs represents an error signal. A differential operational amplifier 48 is arranged to integrate the error signal from the slave and target potentiometers 42 and 46, respectively. The amplifier 48 may be similar to that known as model P2 made by Philbrick Researches, Inc., of Boston, Mass. Intermittent operation of the amplifier 48 is effected by a grounded switch 50 having an arm 51 which is actuated by a notched cam 52 driven by a timer motor 54. Power supply to the potentiometer 42 and 46 is floating so that no integration takes place until the switch 50 is actuated by the timer cam 52.

As best seen in FIG. 2, a wire 56 extends between one contact of the switch 50 and a slider contact of the target potentiometer 46, while a wire 58, having a series arranged variable resistance 60 and a fixed resistance 62, extends between a slider contact of the slave potentiometer 42 and the operational amplifier 48. An integrating capacitor 64 and a parallel arranged fixed resistor 66, form a circuit across the operational amplifier 48. The amplifier 48, which is grounded at 68, has its discharge end connected to the inductor 70 of a relay controller 72. The latter may be similar to that made by the Barber-Colman Company, of Rockford, Ill., and known as type 7312-100. Resistor 66 should have a high enough resistance so as not to seriously alter the linear charge and discharge of the capacitor 64. This requires an RC time constant of several times the largest control time used. Actually, resistor 66 would not be necessary in the circuit except for the fact that the capacitor 64 would not completely discharge without it, due to the relay controller 72 dropping out at some small, but finite, voltage. A fixed resistor 74 and a feedback variable resistor 76 join the wire 58 to a wire 78, one end of which is grounded through a resistor 80, the other end of which is connected to the relay controller 72. The inductor 70 of the latter is connected to the switch 50 via a wire 82 having a dead band adjustable resistor 84. The relay controller 72 is positioned to selectively operate solenoids 86 and 88, which are connected to D.C. operative means for three-way liquid flow valves 90 and 92.

The ratings of the various components of the electrical circuit 44 will depend upon the operational characteristics required of the circuit; however, such may be easily determined by those skilled in the art of electrical circuitry, once such operational characteristics are established as required for proper operation of the circuit in a control arrangement made in accordance with the principles of the invention. Furthermore, certain safety features may be incorporated in the system, such as limit switches to disrupt control operation when the web 10 brakes or suddenly exceeds maximum width range limits. Also, the timed sequence of operation should assure that each integration of potentiometer signal takes place as frequently as possible, but only after the results of a previous control action are evaluated.

As best seen in FIG. 4, such valves, which are normally closed, are adapted when operated, i.e. opened, to meter the amount of liquid, such as oil, into or out of a liquid circuit adapted for regulation of the oil level in a sack, or bubble 94 of the plastic tube emerging from the extruder 12. The liquid circuit, which functions as a process correcting means, includes an inlet pipe 96 and an outlet pipe 98, arranged in a circuit which passes through a heat exchanger 100. The inside of the sack 94 is open to atmosphere and the liquid circuit is void of air, hence the height of oil in the sack is dependent upon the volume of oil in the liquid circuit. The level of oil in the sack 94 affects the diameter of the plastic tube 10; as the oil level increases, more lateral pressure is exerted upon the tube while still in soft, stretchable condition, thus increasing the tube diameter over extended size, while the converse is true as the oil level decreases. Passage of the tube through the water bath, cools the plastic so that it is set at a given diameter. A pair of pinch rollers 102 serve to maintain the oil in the bubble 94 and also flatten the bubble to its web form 10. A gear pump 104 driven by motor 106, circulates oil through the liquid circuit, while an auxiliary gear pump 108, driven by a slow speed motor 110, continuously circulates oil through the valves 90 and 92 from an oil reservoir (not shown).

The overall operation of the automatic control system above disclosed will now be described. Assume that the web width begins to increase from predetermined dimension, and that such increase is uniform along both edges of the web. The ultrasonic energy passing between the jaws of the sensor heads 6 and 8 will be diminished, whereupon the servo-amplifiers 34 and 36, respectively, will initiate motor operation to effect repositioning of the sensor heads so that the signal being transmitted to the amplifiers will return to preset value. Toward this end it will be seen that motor B will cause clockwise movement of the lead screw 14 whereby the sensor head 8 will be moved away from sensor head 6.

Rotary movement of the lead screw by motor B causes a repositioning of the slave potentiometer 42. The timer motor 54, which is continuously operating, rotates the notch cam so that the switch arm 51 engages the notch. Such action completes the circuit through the wire 56 whereupon the operational amplifier 48 integrates the voltage deviation signal from the slave potentiometer 42. As the switch arm 51 is moved out of the notch of the cam 52, the switch is moved back into the initial position whereby a ground is completed through the wire 82. The relay controller 72, which is adapted to sense the output voltage and polarity of the amplifier 48, will operate to open the flow valve 92 so that oil will flow out of the oil circuit of pipes 96 and 98. As a result, the oil level in the bubble 94 is lowered, hence, the bubble dimater is reduced, thus decreasing the width of the web 10.

The voltage drop across resistor 80 is of such polarity as to cause the integrating capacitor 64 to discharge linearly. When the output voltage of the operational amplifier 48 approaches zero, the relay controller 72 opens and the control cycle phase is complete until the switch 50 is again operated by the notched cam 52. It is to be noted that the electrical circuit 44 will operate in such manner that the time interval of operation of controller 72 is proportional to the input error signal fed into the amplifier 48.

The new decreased width of the web, as a result of lowering of the oil level in the bubble, will initiate motor operation so that the sensor head 8 is moved toward sensor head 6. Rotation of the lead screw to effect such inward movement of the sensor head 8 will cause a resetting of the slave potentiometer 42 so that the error signal is progressively decreased. As a result, the system will automatically operate until the web width is returned to predetermined dimension. The oil level will be maintained at the controlled height for producing the desired web width, until other factors operate to change the diameter of bubble 94.

In the event the web width should begin to drift toward less than preset dimension, the system will automatically operate to increase the oil level in the bubble 94. Such an operation will be initiated by movement of the sensor heads toward each other as a result of change of signal to the amplifiers 34 and 36. Rotary movement of the lead screw will cause a resetting of the slave potentiometer 42. As a result, a new error signal will be fed into the operational amplifier in the manner as previously described. However, the output of the amplifier 48 will result in operation of the three-way valve 90 so that more oil will be forced into the flow circuit, including the pipes 96 and 98. As a result, the oil level in the bubble 94 will be increased, resulting in an increase of web width dimension. Increase in web width dimension will be monitored by the system until the predetermined width is arrived at, at which point the system will automatically discontinue change of oil level in the bubble.

Study of the system disclosed above will show that it will automatically operate to maintain predetermined web width even when there is a wander or change of midpoint of the web.

While the above controller arrangement has been described in connection with a process for regulating the web width of an extruded plastic tubing, it will be apparent that it will be applicable for other processes. For example, in conjunction with some type of thickness measuring system, as in the case of a metal sheet rolling operation, the thickness of the product being rolled could be adjusted by control of the calender rolls by means of motorized screws. Other examples where a stepwise control according to the principles of the invention could be utilized to adjust speeds, temperatures, pressures, flowrates, etc., to effect process control, will suggest themselves.

It will be seen from the above disclosure that the automatic control system of the invention will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. For use in an automatic control system wherein a process variable is to be maintained within a predetermined range, which system includes sensor means for monitoring and measuring changes in said process variable and generating an error signal indicative of a change in said process variable from a preset value, an electrical circuit comprising integrating means including a resistor and a capacitor for integrating said error signal to generate a control signal; means coupled to said integrating means for providing a feedback voltage thereto of a polarity such that said control signal has an on-time which is linearly proportional to the integrated value of said error signal; and control means operated in response to said control signal to influence the process so that the process variable is returned to said preset value.

2. The electrical circuit of claim 1 further including switch means for automatically periodically coupling said error signal to said integrating means for a predetermined period of time.

3. The electrical circuit of claim 1 wherein said control means comprises means sensitive to the polarity of said control signal and operated in accordance therewith to couple a source of power of a predetermined polarity in series with said resistor of said integrating means to thereby provide a voltage drop across said resistor of such polarity as to cause said capacitor of said integrating means to discharge linearly, whereby a control signal having an on-time which is linearly proportional to the integrated value of said error is provided.

4. For use in an automatic control system wherein a web width is to be maintained within a predetermined range, a web with edge monitoring and measuring means comprising sensor means for monitoring and measuring said web width, said sensor means being adapted to generate an electrical signal indicative of change of location of the edge of said web from a given set point; sensor control means operated in accordance with said electrical signal to positionally adjust said sensor means to follow said web width edge; means coupled to said sensor control means for generating an error signal indicative of the change of location of the edge of said web; integrating means including a resistor and a capacitor for integrating said error signal to generate a control signal; means coupled to said integrating means for providing a feedback voltage thereto of a polarity such that said control signal has an on-time which is linearly proportional to the integrated value of said error signal; and control means operated in response to said control signal to influence the process so that the web width is returned to said given set point.

5. The web width edge monitoring and measuring means of claim 4 wherein said control means comprises means sensitive to the polarity of said control signal and operated in accordance therewith to couple a source of power of a predetermined polarity in series with said resistor of said integrating means to thereby provide a voltage drop across said resistor of such polarity as to cause said capacitor of said integrating means to discharge linearly, whereby a control signal having an on-time which is linearly proportional to the integrated value of said error is provided.

6. An automatic control system for maintaining a moving plastic web so that the web width is within a predetermined range, said web coming from an extruder which forms a bubble wherein a liquid level is maintained for regulation of bubble diameter, said system comprising sensor means for monitoring and measuring said web width, said sensor means being adapted to generate an electrical signal indicative of change of location of the edge of said web from a given set point; sensor control means operated in accordance with said electrical signal to positionally adjust said sensor means to follow said web width edge; means coupled to said sensor control means for generating an error signal indicative of the change of location of the edge of said web; integrating means including a resistor and a capacitor for integrating said error signal to generate a control signal; means coupled to said integrating means for providing a feedback voltage thereto of a polarity such that said control signal has an on-time which is linearly proportional to the integrated value of said error signal; liquid flow means for regulating the liquid level in said bubble; and control means operated in response to said control signal for controlling the operation of said liquid flow means to return said web width to said given set point.

7. The automatic control system of claim 6 wherein said control means comprises means sensitive to the polarity of said control signal and operated in accordance therewith to couple a source of power of a predetermined polarity in series with said resistor of said integrating means to thereby provide a voltage drop across said resistor of such polarity as to cause said capacitor of said integrating means to discharge linearly, whereby a control signal having an on-time which is linearly proportional to the integrated value of said error is provided to control the operation of said liquid flow means.

8. The automatic control system of claim 6 wherein said liquid flow means includes a pair of solenoid valve means for increasing and decreasing the volume of liquid in said bubble, respectively, each of said solenoid means being coupled to a source of power of different polarities; and wherein said control means comprises means sensitive to the polarity of said control signal and operated in accordance therewith to couple one of said solenoid means and its source of power in a series circuit with said resistor of said integrating means to thereby provide a voltage drop across said resistor of such polarity as to cause said capacitor of said integrating means to discharge linearly, whereby said solenoid means are operated for a period of time which is linearly proportional to the integrated valve of said error signal.

9. The automatic control system of claim 6 wherein said sensor means and said sensor control means comprise a pair of transducers, a lead screw for movably supporting said transducers in spaced relation, said lead screw having opposed thread means for causing relative movement between said transducers, a first motor means arranged to cause rotary movement of said lead screw, a second motor means arranged to cause axial movement of said lead screw, the first of said transducers being arranged to transmit a signal dependent on web edge position to cause operation of the first motor means so that a preset relative position is maintained between the first transducer and a web edge being monitored thereby, the second of said transducers being arranged to transmit a signal dependent on web position to cause operation of the second motor means so that a preset relative position is maintained between the second transducer and a web edge being monitored thereby.

10. The automatic control system of claim 9 wherein said means coupled to said sensor control means for generating an error signal indicative of the change of location of the edge of said web comprises a potentiometer coupled to said first motor means whereby the error signal output thereof is a function of rotation of said first motor means.

11. The automatic control system of claim 8 further including switch means for automatically periodically coupling said error signal to said integrating means for a predetermined period of time and to thereafter open said coupling and to couple the output of said integrating means to said control means.

References Cited

UNITED STATES PATENTS

| | | | |
|---|---|---|---|
| 2,529,897 | 11/1950 | Bailey | 264—95 |
| 2,674,151 | 4/1954 | Garrett | 250—219 |
| 2,810,316 | 10/1957 | Snyder | 250—219 |
| 2,931,917 | 4/1960 | Beelitz | 250—219 |
| 3,000,438 | 9/1961 | Alexander | 18—2 |
| 3,015,129 | 1/1962 | Hays | 18—2 |
| 3,125,616 | 3/1964 | Cook | 264—40 |

FOREIGN PATENTS 917,033    8/1954    Germany.

WILLIAM J. STEPHENSON, *Primary Examiner.*

ROBERT F. WHITE, *Examiner.*

F. S. WHISENHUNT, *Assistant Examiner.*